United States Patent [19]

Kasprzyk et al.

[11] Patent Number: 5,894,509
[45] Date of Patent: Apr. 13, 1999

[54] TELEPHONE OFFICE EQUIPMENT UTILIZATION MONITOR

[75] Inventors: Marlon Z. Kasprzyk, Winfield; John Michael Kyser, Westmont, both of Ill.

[73] Assignee: Lucent Technologies, Inc., Murray Hill, N.J.

[21] Appl. No.: 08/942,992

[22] Filed: Oct. 2, 1997

[51] Int. Cl.$^6$ .................................................. H04M 15/00
[52] U.S. Cl. ...................................... 379/112; 379/134
[58] Field of Search ........................... 379/1, 34, 111, 379/112, 113, 133, 134, 268, 280; 395/292, 184.01

[56] References Cited

U.S. PATENT DOCUMENTS 5,527,611  6/1996  Rajagopal et al. ................. 379/113
5,684,868  11/1997  Alexander .......................... 379/34
5,740,233  4/1998  Cave et al. ........................ 379/134

*Primary Examiner*—Paul Loomis

[57] ABSTRACT

Information on the usage of memory mapped equipment in a telephone switching office can be continuously and non-invasively obtained by monitoring activity on the address, data, and control lines of the computer controlling such equipment. By counting the number of times a circuit is accessed by a computer, as determined by the detection of address, data, and control values for the circuit, equipment usage can be objectively determined. Further, a display device can be attached to an input/output port of a telephone office equipment monitor to provide a graphical representation of data obtained using the display device.

10 Claims, 3 Drawing Sheets

TELEPHONE OFFICE EQUIPMENT UTILIZATION MONITOR

BACKGROUND OF THE INVENTION

1. Field of the Invention

The present invention generally relates to telephone switching equipment and, more particularly, to a monitor for telephone switching equipment used in a telephone switching office.

2. Description of the Related Art

Telephone switching offices include many complex, high-speed switching circuits and computers interconnected together to forming a distributed, computer-controlled switching system. Most of the equipment in a switching office is selected to meet the needs of the subscribers, i.e., the customers of the telephone service provider. A central office serving a rural community may only require hardware to provide basic telephone service. A central office for a metropolitan area likely needs equipment to handle high speed digitized voice, data and video services.

Over time however, equipment needs of a central office change. Equipment in a rural switching office might grow obsolete; equipment in an urban switching center might become inadequate. As the equipment in a telephone central office equipment evolves and the tasks performed by such equipment changes, maintenance workers need to monitor equipment usage in the office.

When considering upgrade, expansion, or replacement of switching equipment, a maintenance technician should have the ability to know whether or not a piece of equipment is operating near its capacity, i.e. the technician should be able to determine usage of central office equipment over time. Data for specific equipment needs to be made available to the technician for continued reliability and cost-effective equipment management. Because telephone switching equipment is now essential to public safety agencies, equipment in a central office requires near-continuous monitoring. Yet, because there may be thousands of switching circuits in a large central office switch, continuous monitoring of all of the hardware in a switching system poses significant logistic difficulties.

Programming the switching system computer itself to track equipment usage would require additional software to be written into the already complex system software. Patching such software into existing system software invariably introduces programming bugs which adversely affect switching system reliability. Even if equipment-usage-software could be seamlessly incorporated into switching system software, execution of the code to perform the task would use CPU time of processors that could be used for call processing.

A non-invasive tool that can continuously keep track of equipment service levels, without degrading system performance would provide hard data on equipment usage that could be used to plan for equipment expansion, prevent service outages, and reduce maintenance costs compared with existing methods of tracking switching office equipment use. Continuously and non-invasively monitoring switching equipment usage throughout a switching office would be an improvement over the prior art, which does not presently provide a tool, to continuously perform dedicated real-time, data collection of switching equipment usage without taxing computational resources of a switching system controller. Such a dedicated tool would be a benefit to a technician, to the telephone service provider, and its customers and would be an improvement over the prior art.

Consequently, there exists a need for a telephone office equipment monitor for monitoring equipment utilization in a typical telephone central office. Additionally, there is a need to monitor the central office equipment in a non-invasive manner.

SUMMARY OF THE INVENTION

There is described herein, a method and apparatus for continuously and non-invasively monitoring memory-mapped switching equipment used in a telephone switching office.

Memory-mapping equipment peripheral to a computer is well-known. Memory-mapped switching equipment, such as memory mapped switching equipment, is accessed by a computer when the computer outputs certain values on address, data, and control lines. By monitoring the address and control lines of the controlling computer, access to, and use of, a memory mapped circuit or device can be assumed.

The telephone office equipment utilization monitor described herein directly monitors the address, data and control lines of a computer by continuously monitoring the address and control lines of the computer for values required to access a particular piece of equipment. When the equipment monitor detects the address and control line conditions used to access a particular piece of equipment, the equipment monitor considers the piece of equipment to have been used and increments a counter tabulating the uses of the equipment.

By counting the number of times a piece of equipment is accessed, the telephone equipment monitor can non-intrusively tabulate the number of times any particular piece of equipment is accessed. Equipment usage can be optimized, information bottlenecks identified, and preventive maintenance scheduled appropriately.

The equipment monitor looks directly into a switching system by being coupled to the address, data, and control lines of the computer controlling the system. The monitor does not require and does not affect system software, yet continuously gathers data on equipment being controlled by such software.

DETAILED DESCRIPTION OF THE PREFERRED EMBODIMENT

Figure 1:
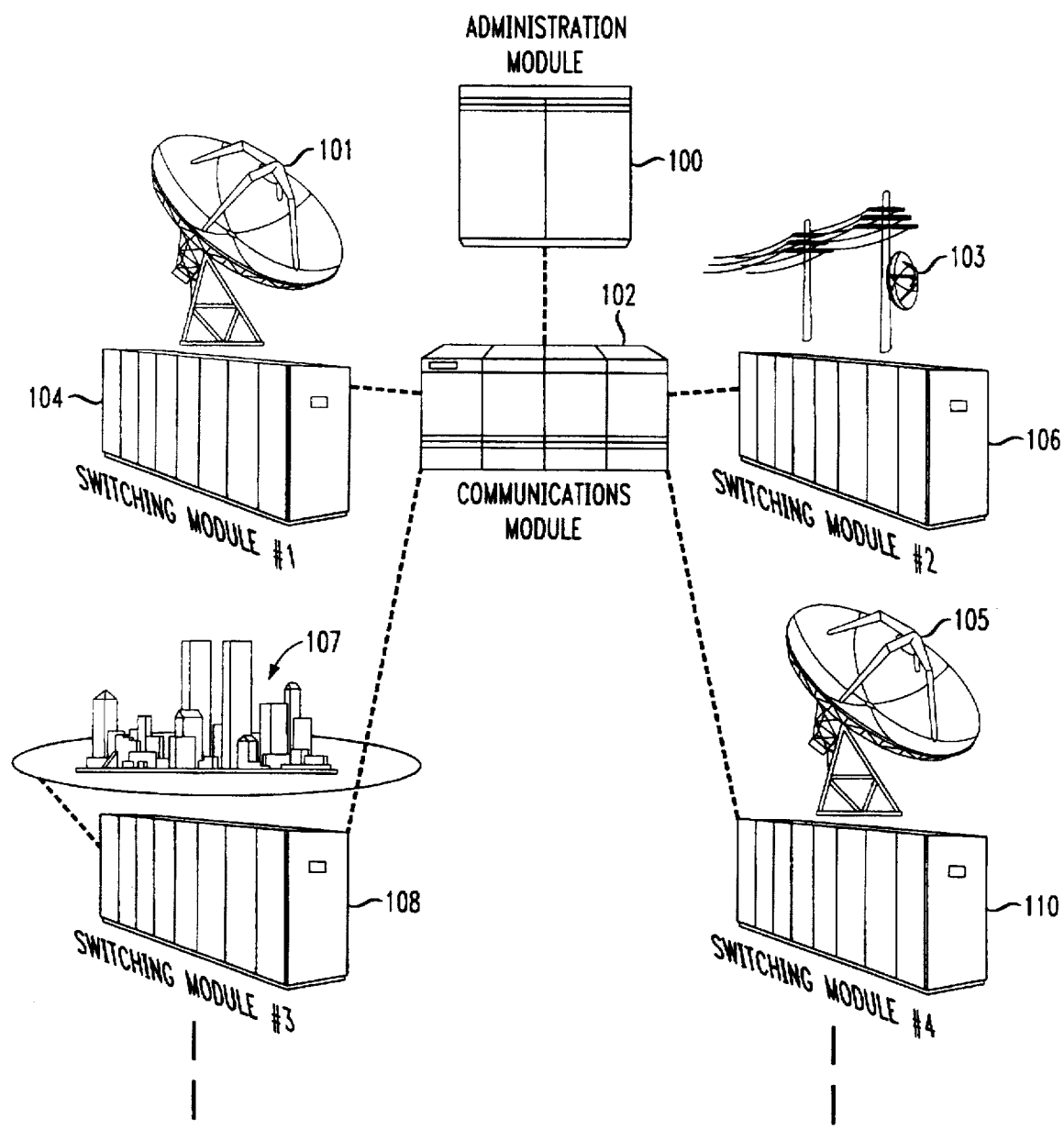
FIG. 1 shows a diagram of the operational relationship between some of the equipment in a prior art telephone central office.

FIG. 1 shows some of the operational relationships of some of the equipment of a Lucent Technologies 5ESS® switch and depicts an example of a switching system used in a telephone central office. The 5ESS® switch has three major system components. An administration module 100, a communications module 102 and a plurality of switching modules 104, 106, 108 and 110. The four switching modules shown in FIG. 1 represent the plurality of switching modules of a typical switch.

The administration module 100 performs several administrative tasks. Among other things, it searches switching equipment for available trunks to carry telephone calls; collects and provides billing information; and runs diagnostics on equipment as required. The administrative module 100 could include a Lucent Technologies 3B computer.

The communications module 102 switches telephone calls between switching modules 104, 106, 108 and 110. The switching modules themselves provide the mechanism for actually switching a call through the switch.

Much of the equipment used in a telephone switching system, including the equipment used in a 5ESS® switch shown in FIG. 1 is memory mapped. Memory mapped peripheral equipment is prior art. Briefly, a memory mapped circuit or other device to be accessed or controlled by a computer is coupled to control lines of the computer. These control lines include the so-called address lines and other special purpose control lines such that when certain signals are present on these control lines, the circuit or other device can be accessed by the computer. Access to a memory mapped device by a controlling computer can be assumed when the appropriate signals are present on the address, data, and control lines of the computer that is coupled to the device.

Figure 2:
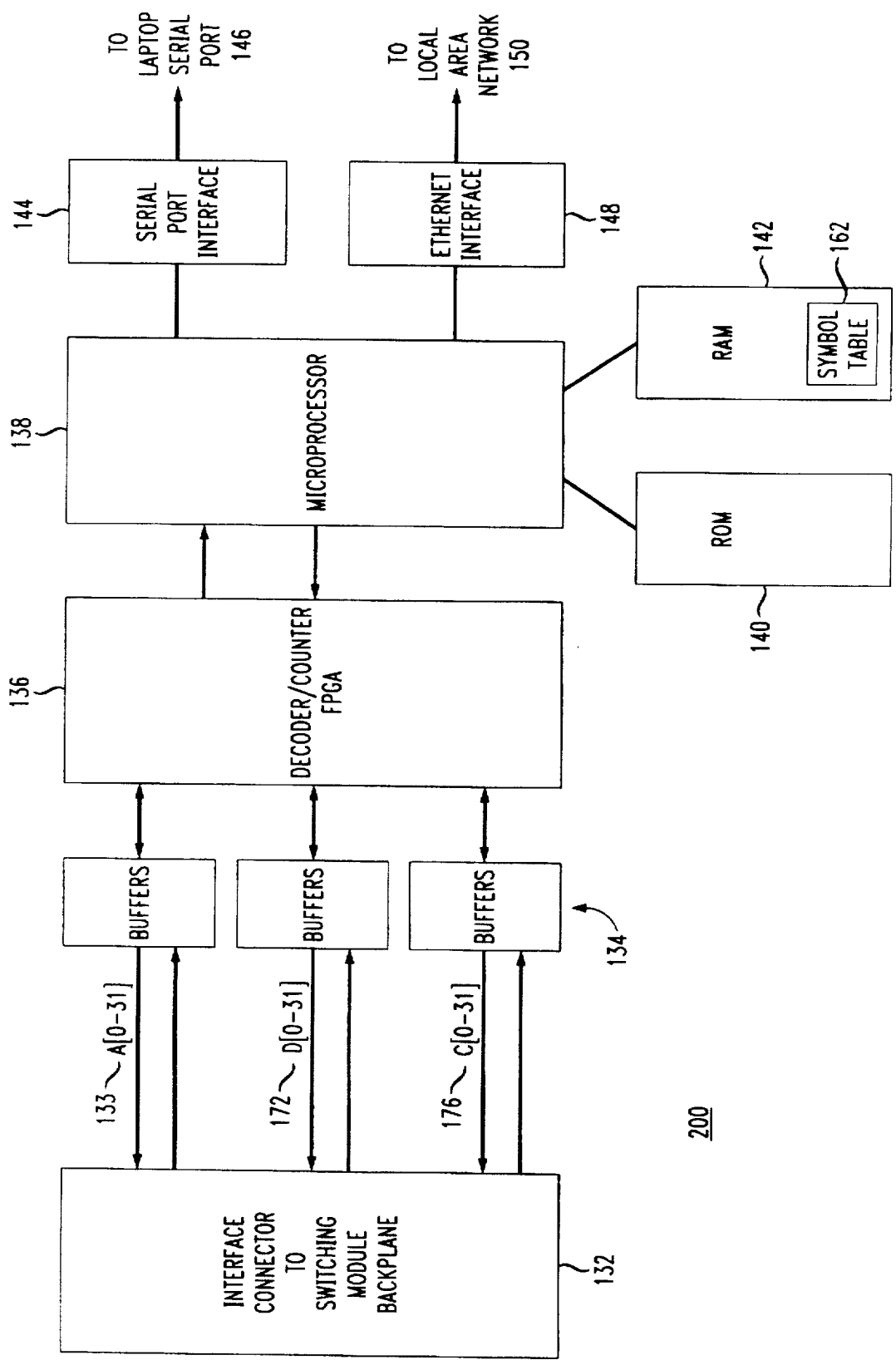
FIG. 2 shows a functional block diagram of the interconnection of components of the Telephone Office Equipment Monitor.

FIG. 2 shows a functional block diagram of the telephone office equipment monitor 200. A switching module interface connector 132 attaches directly to the backplane of a switching module, such as the switching module of a 5ESS® switch, to couple tri-state signal buffers 134 to the address, data, and control lines of the switch. Data from the tri-state signal buffers is coupled to an address decoder/counter 136, which is in turn coupled to a microprocessor 138.

Operating instructions (the program) for the microprocessor 138 is stored in read only memory (ROM) 140 and a random access memory (RAM) device 142. An interface to a personal computer (PC) 144, which provides a user interface to the telephone equipment monitor 200, is also provided. The personal computer Monitored signals on the address, data and control lines of a switching system, such as the system shown in FIG. 1, are obtained through the switching module interface connector 132. These signals are buffered by tri-state signal buffers 134 to minimize inductive and capacitive loading on the busses, thereby helping the telephone equipment usage monitor to remain unobtrusive to the system. The tri-state buffers 134 also serve as a temporary storage location for information read from the address, data, and control lines. In order to reduce interference with the switching module 104, 106, 108, and 110, no connections are made directly to the switching module's master clock (not shown).

The address decoder/counter 136 decodes addresses values on the address lines to which the monitor is coupled. The decoder/counter is programmable and can be reprogrammed at will under the control of the microprocessor 138 so as to select at will, different address values corresponding to different equipment to be monitored and thereby monitor usage of different memory mapped devices.

As set forth above, memory mapped equipment can be considered to have been accessed when the address, data, and control line signals for that particular piece of equipment appear on the address, data and control lines of the computer controlling the equipment. Each time a particular piece of telephone office equipment is accessed, as determined by the values on the address, data and control lines, a counter in the decoder/counter 136 is incremented. The microprocessor 138 reads this count from the counter/decoder 136 and stores the running, accumulated total count in random access memory (RAM) 142 from which the count can be retrieved for subsequent use by maintenance personnel.

A serial interface 144 provides a means by which a personal computer or other appropriate computer can access data stored in the telephone equipment service monitor 200. A personal computer or other appropriate computer terminal, not shown but which are well-known, would function as display device for the telephone office equipment monitor. Input data to the monitor and tests results from the monitor can be readily displayed, graphically for example.

At power up, the microprocessor 138 resets the telephone office equipment monitor 112 to a known state and initializes the address decoder/counter 136. In addition to the aforementioned serial interface, data from the address decoder/counter 136 can be extracted a LAN interface 150 that is part of an ethernet interface module 148.

A symbol table 162 stored in RAM 142 of the monitor 200 is used to identify the specific values of the three busses that are necessary to access each piece of peripheral equipment. The symbol table is part of the software load of the switching system 100. The symbol table contains the definitions of addresses of memory mapped hardware circuits and definition of the hardware components of the switching system.

The microprocessor 138 can read the symbol table directly from the memory of the switching system if the monitor 138 is appropriately coupled to the switching system memory. Alternatively, the symbol table of the switching system 100 can be downloaded into the monitor 200 from an external source, such as magnetic tape, CD ROM or the like, into the RAM of the monitor 200 so that the monitor knows the addresses and definitions of equipment in the office. An appropriately configured monitor can have the microprocessor 138 maintains the symbol table 162 by its reading values directly from memory of the switching system it is monitoring or by loading the data into the equipment monitor 200. The ability to locate and read a symbol table 162 provides the telephone equipment service monitor with the ability to monitor equipment, even as the system software evolves and system hardware is added and/or deleted. The symbol table 162 provides data by which the addresses of peripheral, memory-mapped equipment can be obtained.

Equipment utilization information is obtained by monitoring addressable memory spectrum of the switching system. This information can be captured by the telephone office equipment monitor while a particular unit is in service and thus, service is not interrupted.

By knowing where a switching system element is located in addressable memory space, detecting when that particular memory location is accessed, and counting the occurrences of such access, the telephone office equipment monitor can continuously track equipment usage on a non-intrusive basis.

In the preferred embodiment, the decoder/counter 136 is preferably a field programmable gate array (FPGA). FPGA devices are available from Lucent Technologies, Altera and Lettice. When a new piece of equipment is added and should be monitored, the decoder/counter 136 is reprogrammed to monitor the address, data and control lines for that piece of equipment. The microprocessor is an Intel model 8751 although other suitable microprocessors could be used as well.

The decoder/counter 136 effectively filters or screens the values on the address, data, and control lines so as to effectively look for the values on these lines that determine when a particular piece of hardware has been accessed. However, since typically, a piece of hardware equipment may be used for a number of difference services, additional information is necessary to determine what kind of call has been put through the accessed hardware equipment. FIG. 4 depicts the method used by the telephone office equipment monitors to identify the particular service on the equipment.

Figure 3:
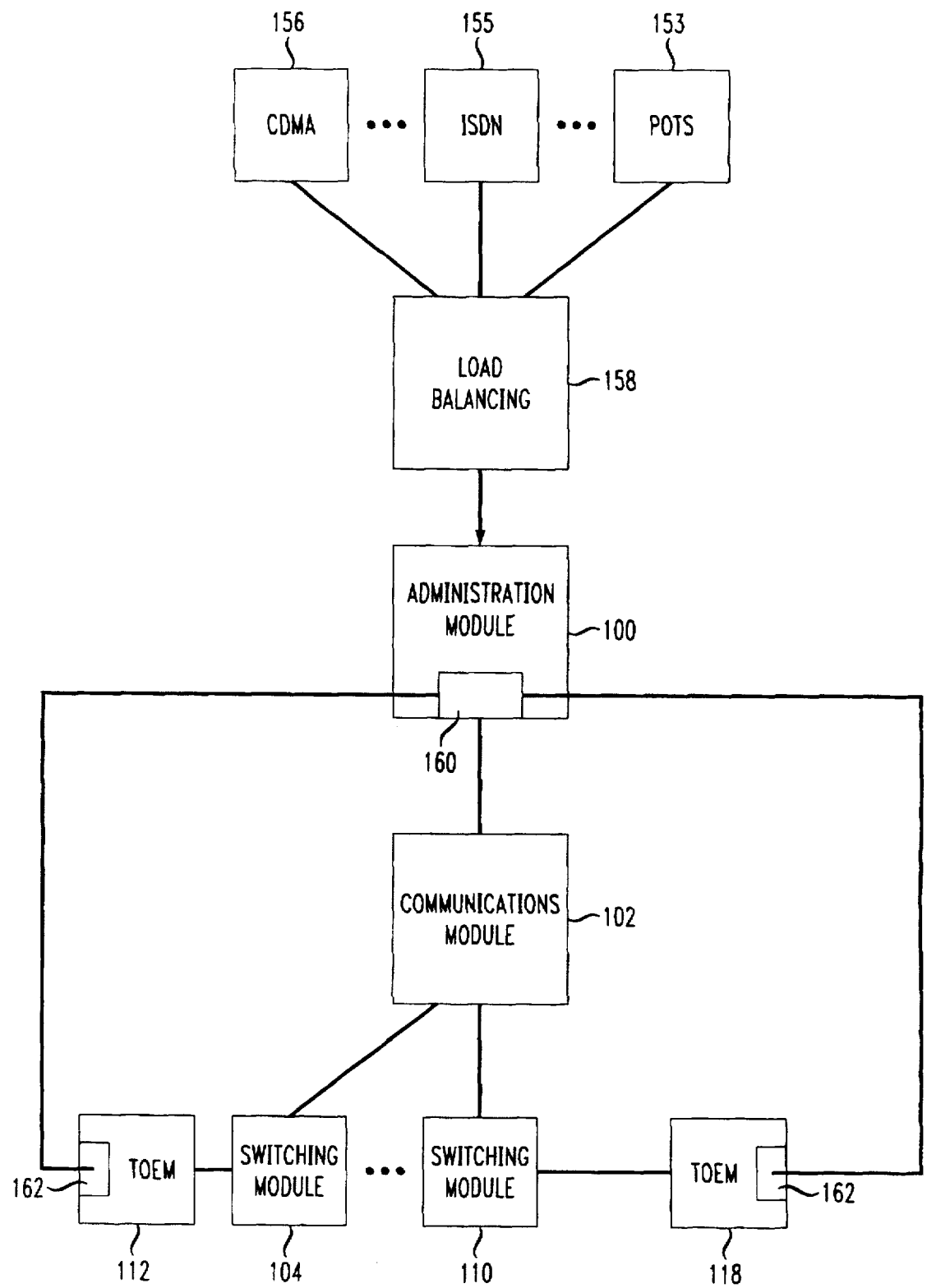
FIG. 3 shows an interconnection of the Telephone Office Equipment Monitor and the switching system of FIG. 1 having associated services switched through the switching system.

FIG. 3 shows how a telephone office equipment monitor connects to a switching system so that information on central office equipment used to support a particular service is identified.

The administration module 100 contains the memory addresses in its memory 160 of hardware or switching equipment. The telephone office equipment monitors 112 and 118 access the program loaded in memory 160 and generates the symbol table 162. The symbol table 162 contains vectors (addresses) that identifies equipment in the central office. As hardware equipment is added or removed and new software addresses are associated with the hardware equipment, this information is downloaded to the symbol table 162. New addresses also occur when new software is downloaded or when the software is recompiled. The symbol table 162 ensures that the most current addresses of the hardware equipment are available and allows the telephone office equipment monitor 112 and 118 to know what piece of equipment is utilized as well as the services residing on that equipment by the address, data and control line values needed to access a piece of equipment.

By changing the programming of the microprocessor, the equipment usage monitor starts collecting data and/or to stop collecting data under program control. By reading the memory locations of equipment to be monitored from a symbol table, the equipment usage monitor can continue its surveillance of switching equipment as software loads change and hardware is added and deleted. The telephone equipment usage monitor transparently monitors use of switching equipment over long intervals without requiring CPU time of any processor controlling the telephone switching system.

What is claimed is:

1. In a telephone central office comprising memory mapped switching equipment controlled by a computer through control lines, a method of monitoring the utilization of said equipment in said central office comprising the steps of:

a) collecting address information of a first piece of said equipment in said telephone office equipment monitor when said first piece of equipment is accessed;

b) filtering said address information by said telephone office equipment monitor to associate said address with a specific piece of said equipment and selectively passing desired said address information; and c) incrementing a counter of said telephone office equipment monitor for said desired said address information and storing in memory of said telephone equipment monitor a count of said address information.

2. The method of claim 1 farther comprises the step of:

d) reprogramming said telephone office equipment monitor to collect address information of a second piece of equipment.

3. The method of claim 2 further comprises the step of:

e) sending output data from said telephone office equipment monitor to an interface port located at an end of said telephone office equipment monitor; and f) connecting a display device to said interface port of said telephone office equipment monitor for receiving said output data.

4. The method of claim 3 wherein step f) of connecting a display device to said interface port of said telephone office equipment monitor for receiving said output data, is further comprised of:

g) displaying said output data of said telephone office equipment monitor in a graphical representation on said display device.

5. The method of claim 4 further comprises the steps of:

h) accessing said switching system memory by said telephone office equipment monitor to obtain software information for said plurality of services associated with each said equipment; and i) generating a symbol table in said telephone office equipment monitor for correlating and storing said address information of said equipment and information of each said plurality of telephone services associated with said equipment.

6. The method of claim 5 further comprises the steps of:

j) forwarding said information on said plurality of telephone services associated with said equipment from said symbol table to said interface port of said telephone office equipment monitor for display on said display device.

7. An telephone office equipment utilization monitor for monitoring equipment utilization comprising:

a plurality of buffer circuits having inputs coupled to control lines of a computer and having outputs;

a field programmable gate array coupled to outputs of said plurality of buffer circuits and being programmed to detect at least one predetermined pattern of signals on said control lines and input to said plurality of buffer circuits; and a counter coupled to said field programmable gate array for counting occurrences of predetermined patterns of signals on said control lines.

8. The apparatus of claim 7 further comprising:

access means for accessing said switching system memory by said telephone office equipment monitor to obtain software information for plurality of services associated with each said equipment.

9. The apparatus of claim 7 further comprising:

a serial communications port attached to said telephone office equipment monitor for connecting said telephone office equipment monitor with external devices.

10. The apparatus of claim 9 wherein said external device comprises a display device for displaying a graphical representation of utilization of said hardware component of said central office.

* * * * *